Dec. 13, 1966 D. P. DARWIN ETAL 3,291,485

RECORD CARD STACKING APPARATUS

Filed April 26, 1965

INVENTORS
DANIEL P. DARWIN
WILLIAM L. WILCOX

By Otto Schmid, Jr.

ATTORNEY

United States Patent Office
3,291,485
Patented Dec. 13, 1966

3,291,485
RECORD CARD STACKING APPARATUS

Daniel P. Darwin, Saratoga, and William L. Wilcox, San Jose, Calif., assignors to International Business Machines Corporation, Armonk, N.Y., a corporation of New York Filed Apr. 26, 1965, Ser. No. 450,929
6 Claims. (Cl. 271—71)

This invention relates to apparatus for stacking record cards and, more particularly, to apparatus for stacking record cards which are fed thereto serially at high speed.

When stacking cards at high speed, a problem is encountered in preventing damage to cards from two major causes. The first major source of damage is caused by stopping the motion of the card from too great a velocity, which damages the end of the record card. The second major source of damage is relative motion between the leading end of one card and a punched portion of a second card moving at high velocity, which damages the area of the second card around the data holes, and the first card at the leading end. The recent introduction of standard codes which require a greater number of punched holes per column has accentuated this problem since record cards punched in this code have a greater number of data holes which also results in increased flexibility of the card. It has been found that in stacking cards fed serially at high speed, the path of a card cannot be accurately determined when the card is free-thrown for any substantial distance due to varying contours of the cards and the increased flexibility of the cards with the result that card jams or misstacking can result.

It is therefore the principal object of this invention to provide an improved record card stacking apparatus wherein positive control is maintained over the record cards to a point as near as possible to the final stacked configuration of the cards.

It is another object of this invention to provide an improved stacking device capable of stacking record cards fed serially at high speed.

It is another object of this invention to provide an improved stacking device from which cards may be withdrawn during a stacking operation without interference with the stacking operations.

According to the invention, there is provided a device for stacking record cards at a high velocity comprising first and second card guide means defining a card path wherein the first card guide means is convex-shaped so that the card is fed in a substantially upward direction. A feeding means is provided at the intersection of the two guide means to advance the card along the card path. The second card guide means is concave shaped so that the card is forced to follow the curvature of the second guide means to a resilient stop means which is mounted substantially one card length from the feeding means. A card gating means is mounted adjacent to the feeding means to normally close the card path and the card gating means is opened by the driven card sufficient to permit the card to pass. A biasing means is provided to close the gating means as soon as the card clears the gating means. An inclined surface is provided on the card gating means so that when the card reverses direction due to the pull of gravity and the resiliency of the stop means, the inclined surface from the gating means forces a positive separation between succeeding record cards. The card continues to move downward by the force of gravity to a joggler means which is actuated to move the cards into a stacked relationship.

The foregoing and other objects, features and advantages of the invention will be apparent from the following more particular description of a preferred embodiment of the invention, as illustrated in the accompanying drawings.

Figure 1:
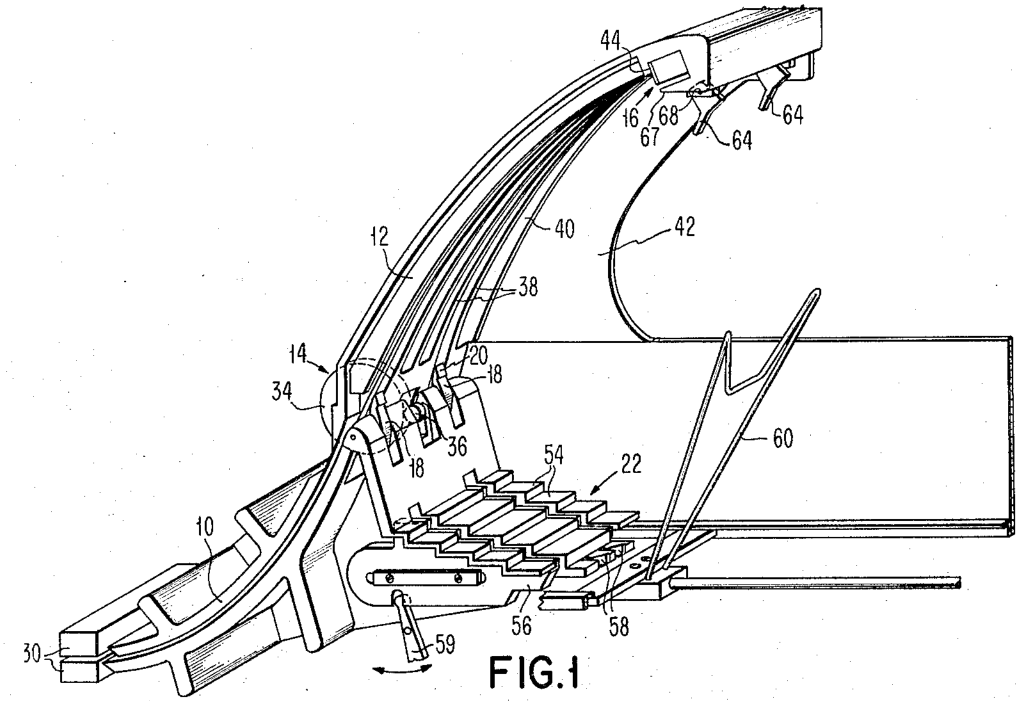
FIG. 1 is a perspective view showing some parts of a partially cut away stacking apparatus embodying the invention.

Referring to the drawings, there is shown a record card stacking apparatus comprising a first guide means 10 and a second guide means 12 defining a card path which is designed to keep the record card under positive control through its length. A feeding means 14 is provided at the intersection of the guide means to drive the record card through the card path. A card gating means 18 is provided near the feeding means, and the card gating means is biased to normally close off the card path. The force of the card being driven along the card path is sufficient to move the card gating means aside a distance sufficient for the card to pass. A resilient stop means 16 is provided at the end of the guide means 12 to absorb the kinetic energy of the card without damage, and the force of gravity, along with the resiliency of stop means 16, then rebounds the card toward card gating means 18. An inclined surface 20 of the card gating means is provided to separate the rebounding card from the guide means 12 so that the card is positively separated from the succeeding record card. The record card continues to fall under the influence of gravity to a joggling means 22 which is operable to move the cards to a stacking position abutting a stacker end guide means.

Figures 2, 3:
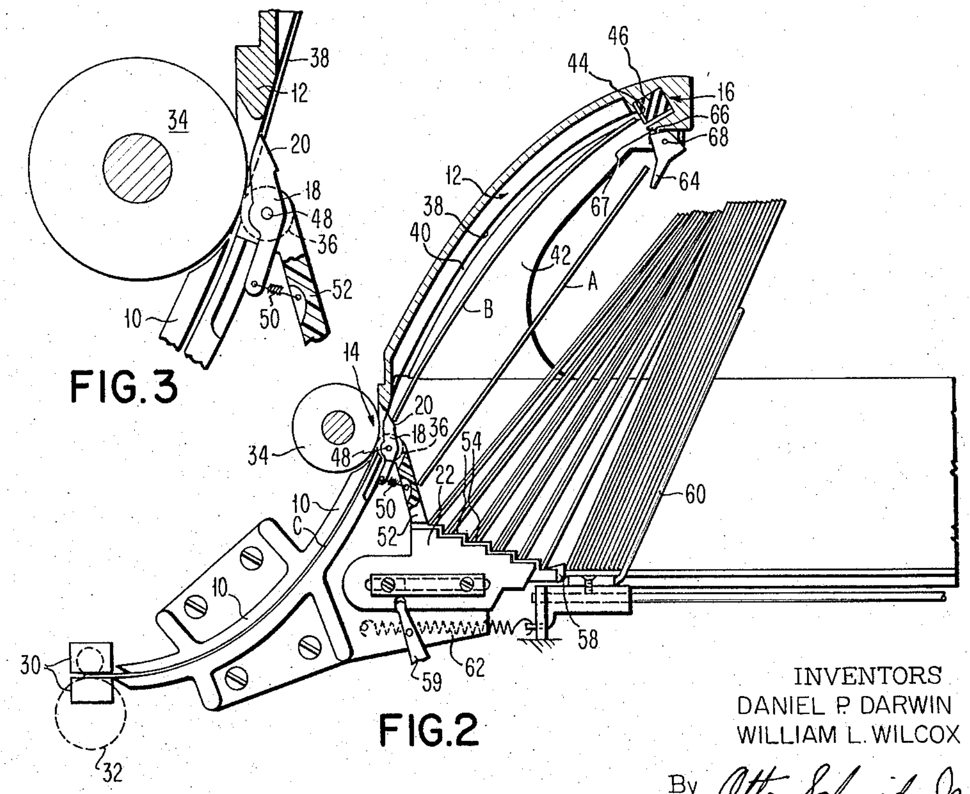
FIG. 2 is a plan view partially in section of the apparatus shown in FIG. 1.
FIG. 3 is an enlarged view of the area of the stacker near the card gating means.

Referring to the specific embodiment of the invention shown in FIGURES 1 and 2, a card may be fed substantially horizontally through a processing station 30 by feeding means 32. Guide means 10 extends from processing station 30 to feeding means 14. Guide means 10 comprises two complementary curved members spaced apart to form a convex-shaped card path. Feeding means 32 moves the card along the card path defined by guide means 10 until the card is moving at a small angle to the vertical. Feeding means 14 is spaced approximately one record card length from feeding means 32 so that the card is continuously driven along the card path. Feeding means 14 comprises a continuously running feed roll 34 which cooperates with a pressure roll 36 to feed the record cards. Guide means 12 comprises a concave-shaped member which extends from feeding means 14 to stop member 16. In the embodiment shown, the guide member comprises a member having a series of ribs 38 which form the card bearing surface with the exception of the last rib 40 on either side which is extended further than the other ribs and constitutes a side guide for the card. Side guide means 42 serves to keep the cards aligned as they are stacked in the stacker. Stop means 16 comprises a relatively firm member 44 bonded to a resilient means 46. A suitable material for the firm member 44 is polyurethane material having approximately 90 durometer surface hardness and a suitable material for the resilient means is a polyurethane foam material. This arrangement permits a stop member having a striking surface of sufficient hardness to prevent damage to member 44 by the edges of the cards but which is soft enough to prevent damage to the edges of the cards. The card gating means 18 comprises two spaced members mounted for pivotal motion about shaft 48 and each card gate member is biased by a spring member 50 to abut a portion recessed below the card guiding surface of guide member 12 so that the card path is normally closed by the card gate members. Card gating means 18 must be made from a suitable material exhibiting the characteristics of being wear resistant, having low inertia, and capable of being easily manufactured. One suitable card gating member comprises a molded plastic material. One suitable material is a nylon material filled with molybdenum disulfide and graphite such as that sold under the trade name Nylatron by The Polymer Corporation of Pennsylvania. The tension of spring member 50 is chosen so that a card moving along the card path pivots the card gate member on shaft 48 enough to permit movement of the card along the card path formed by the contour of guide member 12. Since the card is moved in a direction that is substantially upward (15 degrees to the vertical in the embodiment shown) by guide member 10, the concave curve of guide member 12 forces the card to follow this contour. The distance from the upper end of card gating means 18 to the facing member 44 of stop means 16 is one record card length. Thus, it can be seen that the record card is positively driven over the card path to within a fraction of an inch of the stop means 16, since the only distance the card is free thrown is the fraction of an inch between the pinch points of feedroll 34 and pressure roll 36 and the end of the card gating members. As soon as the trailing edge of the record card has cleared the card gating means, spring means 50 causes the card gating means to immediately close off the card path so that, when the record card is rebounded from the stop means 16 by a combination of the resilient nature of means 46 and the force of gravity, the record card will have begun to straighten from the contour imposed by being driven along guide member 12 as shown by Card B in FIG. 2. The card strikes inclined surface 20 of the card gating means thereby causing the trailing edge of the card to be deflected downward along inclined rear wall 52 of the stacker. There is no possibility that a gap will remain for the card to re-enter the card gate since the card gate members are mounted opposite recessed portions of guide member 12 as shown in FIG. 3. The preceding card is then normally in the position shown for Card A in FIG. 2. The feeding of cards is normally timed so that, when one card has rebounded approximately to the position shown for record card B in FIGURE 2, the next card, such as Card C in FIGURE 2, is positioned at a point where it is about to enter the card gate area along the card path. It can thus be seen that, even if the succeeding card such as Card C in FIG. 2 is timed slightly early, the movement of the card gate member moves Card B out of the path of Card C as it opens to permit Card C to move along the card path, since Card C is forced to follow the contour of guide 12. For this reason, contact between the cards moving at substantial velocity and the resultant damage to the cards is prohibited. The cards move along the rear wall 52 of the stacker to joggling means 22. Joggling means 22 comprises a plurality of stationary steps 54 and a pair of mating movable step members 56. The movable step members 56 are driven back and forth by arm 59 by suitable means such as a cam and follower (not shown) to move the cards successively down the step members 54. At the last step member 54 is mounted a pivotable detent member 58 which functions to prevent cards removed from the step portion of the stacker from following the return motion of the movable step members 56. The movement of the cards over detent member 58 causes the member to be depressed, but the pivot point of the member is located at a position which causes the members 58 to return to the position shown in FIGURE 2 once the cards have passed. The cards are held in a stacked position by a stacker end member 60 which is mounted for longitudinal movement under a light restraining force applied by spring means 62 to move stacker end member 60 to the right (FIG. 2) as the cards are moved into the stacker. Card guide means 64 are provided to prevent card jams as cards are removed from the stacker while the stacker is in operation. Card guide members 64 are normally held in a position (FIG. 2) by the force of gravity which does not normaly result in contact between the cards being stacked and members 64. In the event that contact between guide members 64 and the card occurs, the guide member is pivoted out of the card path with little effect on the normal stacking movement of the card. The members 64 are mounted for pivotal movement about shaft 68 and the angle formed by surface 66 and the lower surface 67 of member 12 is chosen so that the movement of stacked cards toward guide member 12 is limited. Thus, if cards being removed from the stacker are moved toward the stacking area near guide means 12 the detent member 58 restrains the lower end of the cards and causes the cards to be pivoted about this point. The movement of the upper end of the cards toward the stacking area is limited by surface 66 of members 64. The cards being stacked may contact members 64 in this case but the movement of the stacked cards is limited to a position which will not create a card jam or misstacking.

While the invention has been particularly shown and described with reference to a preferred embodiment thereof, it will be understood by those skilled in the art that various changes in the form and details may be made therein without departing from the spirit and scope of the invention.

What is claimed is:

1. A record card stacking apparatus, comprising:
a first and a second guide means defining a card path;
drive means mounted at the intersection of said guide means for driving a record card along the card path, said first guide means having a convex shape disposed to guide said record card in a substantially upward direction, said second guide means having a concave shape so that the moving record card is forced to conform to said concave shape;
card gating means comprising a member having a first portion normally engaging said guide means to close said card path and a second surface inclined away from said guide means; and
a resilient stop mounted substantially one card length from said card gating means, said record card being separated from said second guide member by being deflected along said inclined second surface of said card gating means as said record card rebounds from said resilient stop to provide positive separation between succeeding record cards.

2. A record stacking apparatus, comprising:
a first and a second guide means defining a card path;
drive means mounted at the intersection of said guide means for driving a record card along the card path, said first guide means having a convex shape disposed to guide said record card in a substantially upward direction, said second guide means having a concave shape so that the moving record card is forced to conform to said concave shape;
card gating means comprising a member having a first portion normally engaging said guide means to close said card path and a second surface inclined away from said guide means;
a resilient stop mounted substantially one card length from said card gating means: a card joggling means comprising a plurality of step portions and means operable to move cards successively along said step portions and onto a stack, said record card being separated from said second guide member by being deflected by said inclined second surface of said card gating means as said record card rebounds from said resilient stop whereby said record card falls to said card joggling means and is stacked thereby.

3. A record card stacking apparatus, comprising:
a first and a second guide means defining a card path;
drive means mounted at the intersection of said guide means for driving a record card along the card path, said first guide means having a convex shape disposed to guide said record card in a substantially upward direction, said second guide means having a concave shape so that the moving record card is forced to conform to said concave shape;

card gating means comprising a member having a first portion normally engaging said guide means to close said card path and a second surface inclined away from said guide means;

a resilient stop mounted substantially one card length from said card gating means: a card joggling means comprising a plurality of step portions and means operable to move cards successively along said step portions and onto a stack, said record card being separated from said second guide member by being deflected by said inclined second surface of said card gating means as said record card rebounds from said resilient stop whereby said record cards falls to said card joggling mean and is stacked thereby;

a plurality of pivoted card restraining members mounted adjacent to said stop member for limiting the movement of cards towards said second card guide means from the stack of cards so that cards can be removed from the stack during operation of the stacker.

4. A record card stacking apparatus, comprising:

a first and a second guide means defining a substantially S-shaped card path;

drive means mounted at the intersection of said guide means for driving a record card along the card path so that the driven record card is forced to conform to the shape of said guide means;

card gating means comprising a plurality of pivotally mounted members having a first portion normally engaging said guide member to close the card path and a second surface inclined away from said guide member to deflect in a downward direction a record card striking said surface; and a resilient stop member mounted substantially one card length from said card gating means, said record card being rebounded from said resilient stop member to strike said second surface of said card gating means to deflect the card away from said second guide means to provide positive separation between succeeding record cards.

5. A record card stacking apparatus, comprising:

a first and a second guide means defining a substantially S-shaped card path;

drive means mounted at the intersection of said guide means for driving a record card along the card path so that the driven record card is forced to conform to the shape of said guide means;

card gating means comprising a plurality of pivotally mounted members having a first portion normally engaging said guide member to close said card path and a second surface inclined away from said guide member to deflect in a downward direction a record card striking said surface; and a resilient stop member mounted substantially one card length from said card gating means;

card joggling means comprising a plurality of step portions and means operable to move cards successively along said step portions and onto a stack;

said record card being rebounded from said resilient stop member to strike said second surface of said card gating means to deflect the card away from said second guide means to said card joggling means.

6. A record card stacking apparatus, comprising:

a first and a second guide means defining a substantially S-shaped card path;

drive means mounted at the intersection of said guide means for driving a record card along the card path so that the driven record card is forced to conform to the shape of said guide means;

card gating means cmprising a plurality of pivotally mounted members having a first portion normally engaging said guide member to close said card path and a second surface inclined away from said guide member to deflect in a downward direction a record card striking said surface;

a resilient stop member mounted substantially one card length from said card gating means;

card joggling means comprising a plurality of step portions and means operable to move cards successively along said step portions and onto a stack, said record card being rebounded from said resilient stop member to strike said second surface of said card gating means to deflect the card away from said second guide means to said card joggling means; and a plurality of pivoted card restraining members mounted adjacent to said stop member for limiting the movement of cards toward said second card guide means from the stack of cards so that cards can be removed from the stack during operation of the stacker.

References Cited by the Examiner

UNITED STATES PATENTS

| | | | |
|---|---|---|---|
| 2,964,314 | 12/1960 | Fiehl | 271—86 |
| 3,052,468 | 9/1962 | Cutaia et al. | 271—71 |
| 3,148,879 | 9/1964 | Kistner | 271—87 |

MARVIN A. CHAMPION, *Primary Examiner.*

A. C. HODGSON, *Assistant Examiner.*